United States Patent
Kalyanaraman et al.

(10) Patent No.: US 10,325,332 B2
(45) Date of Patent: Jun. 18, 2019

(54) INCENTIVIZING HUMAN TRAVEL PATTERNS TO REDUCE TRAFFIC CONGESTION

(71) Applicant: INTERNATIONAL BUSINESS MACHINES CORPORATION, Armonk, NY (US)

(72) Inventors: Shivkumar Kalyanaraman, Melbourne (AU); Ravindranath Kokku, Bangalore (IN); Kent Steer, Melbourne (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 560 days.

(21) Appl. No.: 14/984,718

(22) Filed: Dec. 30, 2015

(65) Prior Publication Data
US 2017/0193614 A1 Jul. 6, 2017

(51) Int. Cl.
*G06Q 30/02* (2012.01)
*G06Q 50/14* (2012.01)

(52) U.S. Cl.
CPC ......... *G06Q 50/14* (2013.01); *G06Q 30/0239* (2013.01)

(58) Field of Classification Search
None
See application file for complete search history.

(56) References Cited

U.S. PATENT DOCUMENTS

| 8,121,780 B2 | 2/2012 | Gerdes et al. |
| 2002/0084917 A1 | 7/2002 | Hauptman et al. |

(Continued)

FOREIGN PATENT DOCUMENTS

| DE | 10224466 A1 | 12/2003 |
| JP | 2011064628 A | 3/2011 |

OTHER PUBLICATIONS

Behavior Insights for an Incentive-Based Active Demand Management Platform, Xianbiao et al., International Journal of Transportation Science and Technology • vol. 4 • No. 2• 2015—pp. 119-134.*

(Continued)

*Primary Examiner* — David J Stoltenberg
(74) *Attorney, Agent, or Firm* — F. Chau & Associates, LLC

(57) ABSTRACT

A system for incentivizing travel patterns to reduce traffic congestion includes a negotiator that receives a travel template from a traveler, transmits a set of journey options to the traveler, receives a journey selected from the journey options, and sends a journey contract to the traveler based on the selected journey, a journey generator that determines the set of journey options based on the travel template, the traveler's historical behavior, and current network conditions, a rewards engine that calculates the reward associated with each journey option based on a reduction in cost for the journey, a location arbitrator that receives location information from the traveler as the travelers performs the journey in the journey contract, and a verification engine that verifies, whether the traveler's journey complied the terms of the journey contract, and determines the traveler's reward as calculated by the rewards engine based on a degree of compliance with the contract.

13 Claims, 4 Drawing Sheets

(56) References Cited

U.S. PATENT DOCUMENTS

| | | | |
|---|---|---|---|
| 2006/0129313 A1* | 6/2006 | Becker | G01C 21/3484 701/533 |
| 2008/0091341 A1 | 4/2008 | Panabaker et al. | |
| 2009/0210242 A1 | 8/2009 | Black et al. | |
| 2009/0210276 A1* | 8/2009 | Krumm | G06Q 10/025 705/7.33 |
| 2010/0106603 A1* | 4/2010 | Dey | G01C 21/3484 705/14.63 |
| 2011/0087524 A1* | 4/2011 | Boss | G01C 21/3461 705/14.1 |
| 2011/0208646 A1 | 8/2011 | McMaster et al. | |
| 2012/0226434 A1* | 9/2012 | Chiu | G08G 1/0112 701/117 |
| 2013/0006464 A1 | 1/2013 | Speiser et al. | |
| 2013/0059607 A1* | 3/2013 | Herz | H04W 4/029 455/456.3 |
| 2013/0162449 A1 | 6/2013 | Ginsberg | |
| 2014/0229249 A1* | 8/2014 | Chiu | G08G 1/0112 705/14.1 |
| 2017/0048664 A1* | 2/2017 | Zhang | G06F 16/9535 |
| 2017/0146351 A1* | 5/2017 | von Cavallar | G06F 16/29 |

OTHER PUBLICATIONS

Cooperative Network for Vehicular Cooperative Network for Vehicular Communications: Game Theoretic Distribution of reward among contributing vehicles, Bilal et al., Cyber Journals: Multidisciplinary Journals in Science and Technology, Journal of Selected Areas in Telecommunications (JSAT), August Edition, 2013.*

Berg et al.; Ttl: Value pricing helps reduce congestion; Journal Ttl: Public Roads, v 62, n. 5, p. 47-52; 1999; Publisher: Federal Highway Administration; Country of Publication: USA; ISSN: 0033-3735; Database: CSA Technology Research Database.

* cited by examiner

INCENTIVIZING HUMAN TRAVEL PATTERNS TO REDUCE TRAFFIC CONGESTION

BACKGROUND

Transportation networks currently experience congestion during times of peak use. Such networks are inflexible in terms of their capacity, i.e., supply. By comparison, transport demand is flexible. One approach to reducing this congestion is to reduce demand. The most common form of this is a 'congestion tax', which charges travelers more money during peak times on historically congested road segments. While a tax penalizes drivers for contributing to congestion, some system have been implemented in which drivers are rewarded for not contributing to congestion. Rewards can be delivered in many ways, for example: (a) qualifying drivers can be placed in a lottery, e.g., http://www.stanford.edu/~balaji/societalnetworks.html; (b) qualifying drivers can be directly paid, such as http://roadpricing.blogspot.in/2011/10/opposite-of-congestion-pricing-and-it.html; or (c) qualifying drivers can receive virtual rewards which can be presented so as to encourage competition.

Another approach is to increase the capacity of the transportation network. This can be (a) permanent, e.g., through major infrastructure projects, or (b) temporary, e.g., through dynamic lane allocation. While congestion taxes have achieved some success, they are politically unpopular and have therefore not been widely adopted. Existing reward based systems verify travel either through special purpose devices added to vehicles or identification cards which are swiped upon arrival. This option has been used by businesses trying to encourage their employees to beat the morning rush hour.

Thus, existing rewards based systems fail to engage travelers in the journey selection process, and fail to take into account the unique needs and patterns of travelers. Existing systems associate rewards and taxes with specific road segments at specific times, and either fine travelers for journeys they do make, or reward travelers for journeys they do not make.

SUMMARY

Exemplary embodiments of the disclosure provide systems and methods for improving the performance of transportation networks by associating rewards with end-to-end journeys, including computation of journeys and rewards which will improve performance, negotiation of journey contracts with travelers, and verification of journeys. A system and method according to an embodiment of the disclosure requires very little specialized infrastructure; an app on a traveler's phone and a server with access to traffic forecasts. A system and method according to an embodiment does not require GPS; it can work on a broad range of low-cost smart phones that are penetrating the market in growth markets such as India. The value of a system according to an embodiment can accrue even at low participation levels (e.g., 10%), which can reduce political backlash while still providing the public with a choice.

According to an embodiment of the disclosure, there is provided a method for incentivizing travel patterns, including receiving from a user a travel template for an expected journey that includes an origin, a destination, and a time window for the journey, comparing the travel template to current and forecasted travel conditions during the time window on a travel network that connects the origin and destination to determine a reward for each of a plurality of paths connecting the origin and destination during the time period, transmitting each path and an associated reward to the user, receiving from the user a decision regarding the plurality of paths and the associated rewards, and transmitting a confirmation of a journey contract to the user, if the user has selected one of the plurality of paths and its associated reward as the path for the user's journey.

According to a further embodiment of the disclosure, the method includes receiving a request for more path options, if the user rejects all of the plurality of paths.

According to a further embodiment of the disclosure, the method includes receiving a list of mobile phone base stations that correspond to a path for the contracted journey, where the contracted journey is decomposed into a finite list of locations, each associated with a mobile phone base station, and each associated with a specified time window.

According to a further embodiment of the disclosure, receiving a list of mobile phone base stations further comprises transmitting path information about the contracted journey to a mobile phone service provider, and receiving the list of phone base stations that correspond to the path from the mobile phone service provider.

According to a further embodiment of the disclosure, receiving a list of mobile phone base stations further comprises receiving a list from a mobile phone service provider of all mobile phone base stations in a geographic vicinity of the contracted journey, and selecting those mobile phone base stations that correspond to the path of the contracted journey.

According to a further embodiment of the disclosure, the method includes verifying performance of the user's journey contract by receiving verification that the user has passed through a threshold number of locations associated with those mobile phone base stations that correspond to the path of the contracted journey within the specified time windows.

According to a further embodiment of the disclosure, verifying that the user has passed through a threshold number of locations comprises receiving a list of timestamps from each mobile phone base station passed that were recorded using a location service on the user's mobile phone.

According to a further embodiment of the disclosure, where verifying that the user has passed through a threshold number of locations comprises receiving a verification signal from the user that indicates whether the user's phone was at the contracted base station locations during the contracted time windows within an agreed margin of error.

According to a further embodiment of the disclosure, the method includes, upon verifying that the user has passed through a threshold number of locations, transmitting a reward to the user based on the journey contract.

According to a further embodiment of the disclosure, determining a reward for each of the plurality of paths connecting the origin and destination during the time period comprises calculating $\psi(c'-c_x)$, where $\psi(\cdot)$ is a non-decreasing function, $c_x$ is a cost associated with path x, and $c'=\varphi(x', M_x)$ where x' represents the expected journey, and $M_x$ represents a graph of a road network connecting the origin and destination of the expected journey, where connections between graph vertices are weighted based on a current or forecasted traffic load, and $\varphi(\ )$ is a cost function which quantifies an impact of journey x' on the network given a network forecast $M_x$.

According to another embodiment of the disclosure, there is provided a system for incentivizing travel patterns, including a negotiator that receives a travel template from a traveler's mobile application, transmits a set of journey options to the traveler, receives a journey selected from the journey options, and sends a journey contract to the traveler based on the selected journey, where the travel template includes an origin, a destination and an approximate departure/arrival time, where each journey option specifies a route from the origin to the destination associated with a start time or time window and a reward, and the journey contract is a selected journey option, a journey generator that determines the set of journey options based on the travel template, the traveler's historical behavior, and current network conditions, a rewards engine that calculates the reward associated with each journey option based on a reduction in cost for the journey, a location arbitrator that receives location information from the traveler as the travelers performs the journey specified in the journey contract, and a verification engine that verifies, based on the location information, whether the traveler's journey complied the terms of the journey contract, and determines the traveler's reward as calculated by the rewards engine based on a degree of compliance with the contract.

According to a further embodiment of the disclosure, the system includes a normal behavior model that is used by the journey generator to determine a reward for each journey option, where the reduction in cost is determined with respect to a normal behavior pattern for the journey option.

According to a further embodiment of the disclosure, the rewards engine determines the reward for each journey option by calculating $\psi(c'-c_x)$, where $\psi(\cdot)$ is a non-decreasing function, $c_x$ is a cost associated with journey x, and $c'=\varphi(x', M_x)$ where x' represents an expected journey, and $M_x$ represents a graph of a road network connecting the origin and destination of the expected journey, where connections between graph vertices are weighted based on a current or forecasted traffic load, and $\varphi(\ )$ is a cost function which quantifies an impact of journey x' on the network given a network forecast $M_x$.

According to a further embodiment of the disclosure, the location arbitrator receives a list of mobile phone base stations that correspond to the contracted journey, where the contracted journey is decomposed into a finite list of locations, each associated with a mobile phone base station, and each associated with a specified time window.

According to a further embodiment of the disclosure, the verification engine verifies whether the traveler's journey complied the terms of the journey contract by determining whether the user has passed through a threshold number of locations associated with those mobile phone base stations that correspond to the path of the contracted journey within the specified time windows.

According to a another embodiment of the disclosure, there is provided a non-transitory program storage device readable by a computer, tangibly embodying a program of instructions executed by the computer to perform the method steps for incentivizing travel patterns.

DETAILED DESCRIPTION OF EXEMPLARY EMBODIMENTS

Figure 1:
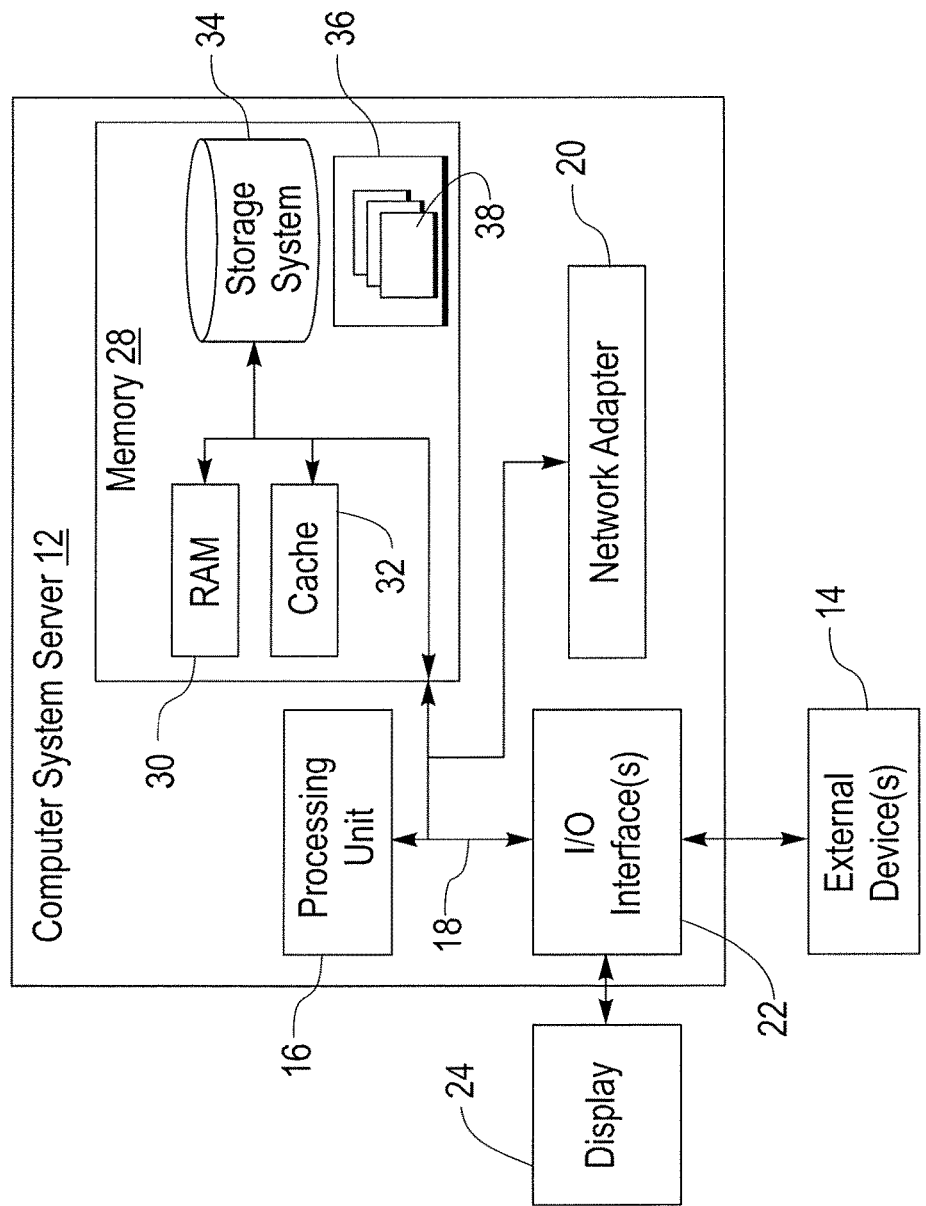
FIG. 1 depicts a cloud computing node according to an embodiment of the present disclosure.

Exemplary embodiments of the disclosure as described herein generally include methods for improving the performance of transportation networks. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. In addition, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 36, having a set (at least one) of program modules 38, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 38 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
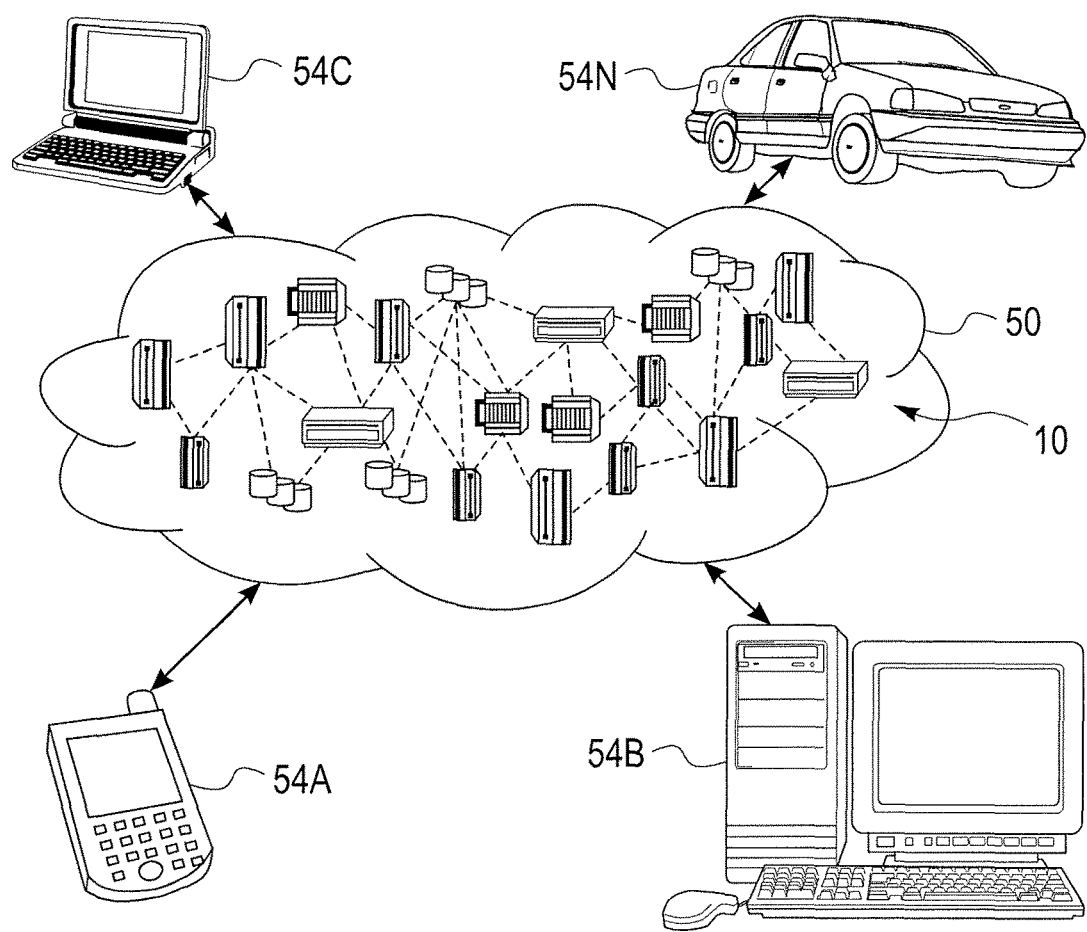
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Exemplary embodiments of the disclosure can reward travelers for behavioral changes that reduce network congestion. By incentivizing travelers to travel at times and along routes which decrease congestion, the burden on transportation networks can be alleviated during peak demand. Given the high cost of increasing supply, i.e., upgrading a transport network, any approach which can decrease or 'shift' demand is financially advantageous.

Computation of Journeys and Rewards

Embodiment of the disclosure provide a journey generation module that can find a set of journey options that will be presented to a traveler based on: (a) the traveler's travel template, which characterizes the current trip goals; (b) the traveler's historical behavior, which characterizes their historical driving behavior; and (c) current network conditions.

For every origin-destination pair there is a set of routes R which a traveler could take. According to an embodiment, a journey generator chooses some subset of routes $S \subseteq R$ to present to the traveler as options. The journey generator also specifies a departure time t or a window of time centered about time t, at which the traveler should depart for each route $r \subseteq S$. That is, each solution x in a journey search space X can be defined by the values of t and r.

To reward changes in behavior that improve network performance, such as reducing congestion, reducing network damage, reducing emissions, a model of "normal behavior" can be used. Such models can be used to compute an expected journey x' based on the travel template. Let $\varphi(x, M)$ be a cost function which quantifies the impact of journey x on the network given a network forecast M. According to an embodiment, M represents the network graph, where the connection between vertices has a weight based on traffic load. M can be represented as a matrix where the element M[i, j] corresponds to the traffic load. For computational reasons, an infinite value can be assigned to disconnected vertices. A cost measure $c'=\varphi(x', M_x)$ can be computed for the expected journey, where $M_x$ is the network forecast associated with journey x. According to an embodiment, the cost would be simply a summation over the impact of the vehicle on each segment it travels along. The impact depends on the predicted state of the network; if a road is empty the impact is zero, if a road is already partially loaded the impact is greater than zero. An impact function would essentially be some monotonically increasing function of the predicted load. For each $x \subseteq X$, $\varphi(\cdot)$ can be evaluated. According to an embodiment, the reward y for a journey x can be based on the reduction in cost from the expected journey: $y(x)=\psi(c'-c_x)$, where $\psi(\cdot)$ is some non-decreasing function, and $c_x$ is the cost associated with path x based on the normal behavior model. To avoid penalizing journeys which increase costs, embodiments use: $y(x)=\psi(\max(0, c'-c_x))$.

According to embodiments, a normal behavior model can be obtained either in a dedicated learning phase or continually based on actual journeys.

A determination according to an embodiment of a set of journeys to be presented to the user will now be described. Candidate journeys can be classified based on, but are not limited to: (a) least cost; (b) least distance (here only time of departure is a variable); (c) least emissions; (d) least travel time; and (e) a targeted reward, i.e., a journey which delivers a specified reward value.

A journey generator according to an embodiment can differentiate journeys by their rewards; and present a user with journeys weighted by point, such as a 10 point, 20 point, 50 point and 100 point journeys. This plays into a gaming concept. In one embodiment, suggested journeys are prioritized in terms of rewards based on the users additional interests, such as intermediate stops for grocery shopping, laundry drop-off or pickup, filling gas at a gas station, stopping for a coffee, etc. In another embodiment the journeys are prioritized based on the rewards available on the road segments, for example, a store along one route may have a special offer for travelers participating in a rewards system.

Negotiation of a Journey Contract with a Traveler

According to embodiments, a journey contract is negotiated with the traveler. Traveler A provides their origin, destination and approximate departure/arrival time information to a negotiator B. According to an embodiment, negotiator B is a back-end server app, or part of a back-end server app. According to an embodiment, the information provided by the traveler is referred to as a "travel template", which can be a client app, or part of a client app, such as a smart phone app. Note that in many cases the travel template can be inferred to reduce the burden on the traveler. For example, A can simply submit an autofilled form provided by the client app. B compares A's travel template with current and forecasted traffic conditions to produce journey options, where a journey is defined by a route and a departure time. For each option, B determines a reward, along with a set of conditions which need to be satisfied for the reward to be received. The journeys can be chosen so as to produce distinguishable rewards. Each journey has a unique ID associated with it. B transmits these options, i.e., routes and associated incentives, to A. A submits to B a decision, either an acceptance of one of these options, with the chosen journey ID, or a rejection of all of them. If all are rejected, A may have the option to request more alternatives. Then, if A has accepted a journey, B sends a final hand-shake message to A confirming that a contract is now in place. A contract ID can be associated with the now-confirmed journey contract.

Verification of Journeys

Embodiments of the disclosure provide methods of verifying that a traveler has honored the contract. According to an embodiment, a phone tower based verification method uses mobile phone tower connection data to track the location of a mobile device within some error margins. A mobile phone service provider can be provided with path information about the journey Contract ID, from which a base-station (BS) ID list for the contracted path segments can be determined. Alternatively, a verification engine according to an embodiment can receive a list from a mobile phone service provider of all mobile phone base stations in the geographic vicinity of the contracted journey, from which a mapping of the Base-Station ID list to the path segment can be prepared in a backend server through spatio-temporal analytics. Techniques known as 'map matching' algorithms, which are geographical information system (GIS) techniques that can associate a sorted list of user or vehicle positions to a road network on a digital map, can be used for this purpose. Map matching algorithms can produce a best estimate of continuous road segments based on a time series of locations. A common use is mapping from GPS traces to road segments, but the same concepts can be used for the more coarse grained base-station ID list, provided the coordinates of the base stations are known. A journey may be decomposed into a finite list of locations with which a set of BS-IDs can be associated. The journey conditions can then be described as having passing through each of the specified locations, possibly within specified windows of time. If at least one, or a threshold number, of (location, BS-ID) tuples have BS IDs in the BS ID list above, a verification engine according to an embodiment 'signs off' on the Contract ID as having met the contract. There may also be a set of BS-IDs indicating base stations the traveler should not be in range of. If all of the conditions associated with the journey contract have been satisfied, then a message is sent from the verification engine to a rewards engine to transfer the contracted reward to the traveler.

Major smart phone operating systems, such as iOS and Android, provide location services at the device level. With these enabled, client apps can access this information and share it with remote services. According to an embodiment, a verification method based on a smart-phone location service uses the location service to record the trip and securely transmit the trip record to a remote arbitrator engine for verification. In an alternate embodiment, the trip can be compared to the agreed upon contract on the mobile device and only a verification signal is transmitted to the arbitrator engine. The role of the application is to verify that the phone was at the contracted 'road segments' or 'path' during the contracted 'time segments', within the agreed margin of error. A location service application according to an embodiment periodically or randomly senses during the chosen/contracted period this location information and constructs a set of tuples: {contract ID, time-stamp, base-station ID}, which is packaged in some tamper-resistant manner and transmitted, such as an email or SMS, to an arbitrator engine according to an embodiment.

Rewards

According to embodiments, rewards may be abstract "points", short term "offers" of some product or service, or may be monetary. Rewards may also be randomly assigned; for example, gamblers prefer a 0.1% chance to win $1000 to a guaranteed $1. A rewards computation engine according to an embodiment can determine how much incentive to give per {path segment, time-segment}, and how much information to base it on. The precise amount can be determined through experimentation. Beginning with low values, the incentive can be increased, limited to some upper bound, until travelers actually change their behavior. If a backend system has congestion level information based upon time-of-day for critical points in the path, from long term analytics or other information feeds, a linear or non-linear mapping function can be created for the offered incentive points. For example, a congested path=0 points, a less congested, longer alternate path, =5 points etc, a very long path with no congestion=0 points. This mapping balances length of path versus level of congestion in the path. In addition, there can be cases where if the user specifies a particular time for their journey, they may find that there are no options that would reward them; all paths are congested. In this case, all paths would have 0 points, suggesting that the user time shift their travel to earn points. A reward would only be provided to the user if they choose to travel at a different time. In this way a temporal dispersion of journeys can be incentivized to balance the load on a road network.

According to an embodiment, the aggregate reward points/prizes could be funded through advertisements or discount coupons from local merchants or other forms of prizes. The rewards can also be certificates or awards from stores to those travelers who picked a threshold number of reward points sponsored by them.

Car Sharing

According to embodiments, car sharing can be incentivized. For example, travelers could be identified who could car share based on a list of 'friends' and a comparison of their journeys. For example, let Bob and Alice be friends who have previously indicated their willingness to car-share. Bob may have just negotiated a journey and accepted the conditions. Alice now begins the negotiation process and is presented with an offer to "car-share with Bob". The conditions on this offer can be based on a comparison of the BS-ID connection sequences of Bob and Alice, taking into account different providers etc. For example, Bob may receive a bonus reward for this arrangement. Embodiments can ensure that users do not cheat by using multiple phones or carrying other's phones without the other person. A 'normal behaviour' model according to an embodiment would help prevent this behavior.

System Implementations

Figure 3:
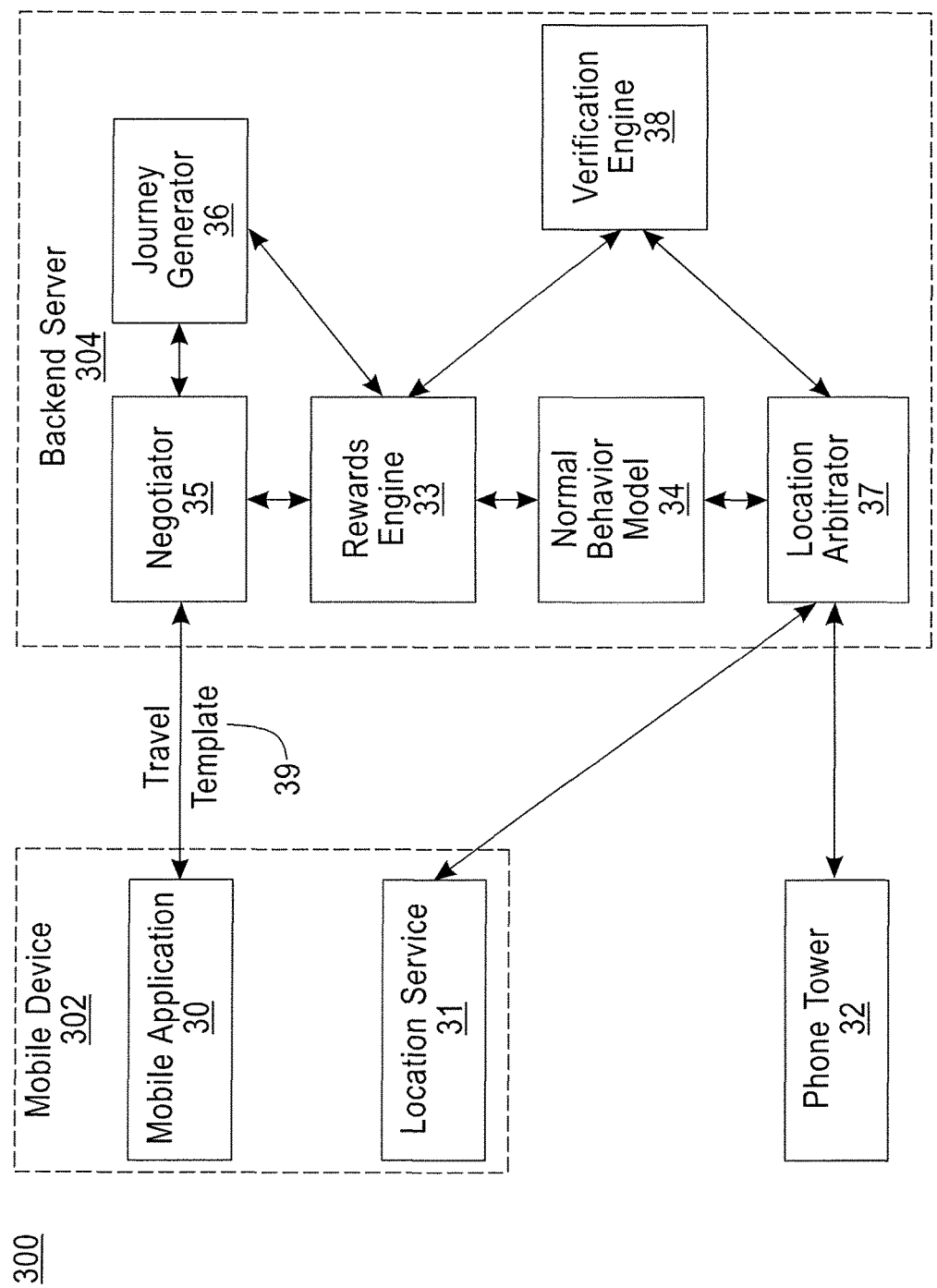
FIG. 3 is a block diagram of an exemplary system for implementing a method for improving the performance of transportation networks, according to an embodiment of the disclosure.

FIG. 3 is a block diagram of an exemplary system for implementing a method for improving the performance of transportation networks, according to an embodiment of the disclosure. Referring to the figure, a system 300 includes a backend server 304, and a mobile application 30 executing on a traveler's mobile device 302, such as a tablet computer or a smartphone. The backend server 304 can be implemented on a cloud computing node 10 such as that shown in FIG. 1. A system according to an embodiment also uses phone towers 32 for communication between the mobile device 302 and the backend server 304. The mobile application 30, which can also be a minimal web client, simply directs requests to/from this backend server 304. According to an embodiment, the mobile application presents a request form to a user and transmits the filled form to the backend server. The filled form may comprise a travel template 39. In addition, as described above, many mobile devices provide a location service 31 that can collect location data to record a trip and securely transmit the trip record to the remote backend server 304.

The backend server 304 includes a negotiator 35, a journey generator 36, the rewards engine 33, the normal behavior model 34, a location arbitrator 37, and the verification engine 38. The negotiator 35 negotiates the journey contract with the traveler based on the travel template 39 received from the traveler's mobile application 30, as described above. The journey generator 36 chooses the subset or routes S⊆R, along with the departure time t or time window to present to the traveler as options. The rewards engine 33 calculates the reward $y(x)=\psi(c'-c_x)$ for a journey x be based on the reduction in cost from the expected journey, as described above, using the normal behavior model 34. The location arbitrator 37 records location information received from the location service 31 on the traveler's mobile device 302, and transmits the location information to the verification engine 38 to verify the traveler's journey contract. The verification engine 38 uses the location information to verify whether the traveler's journey met the terms of the journey contract, and if so, determines the traveler's reward as calculated by the rewards engine 38.

Figure 4:
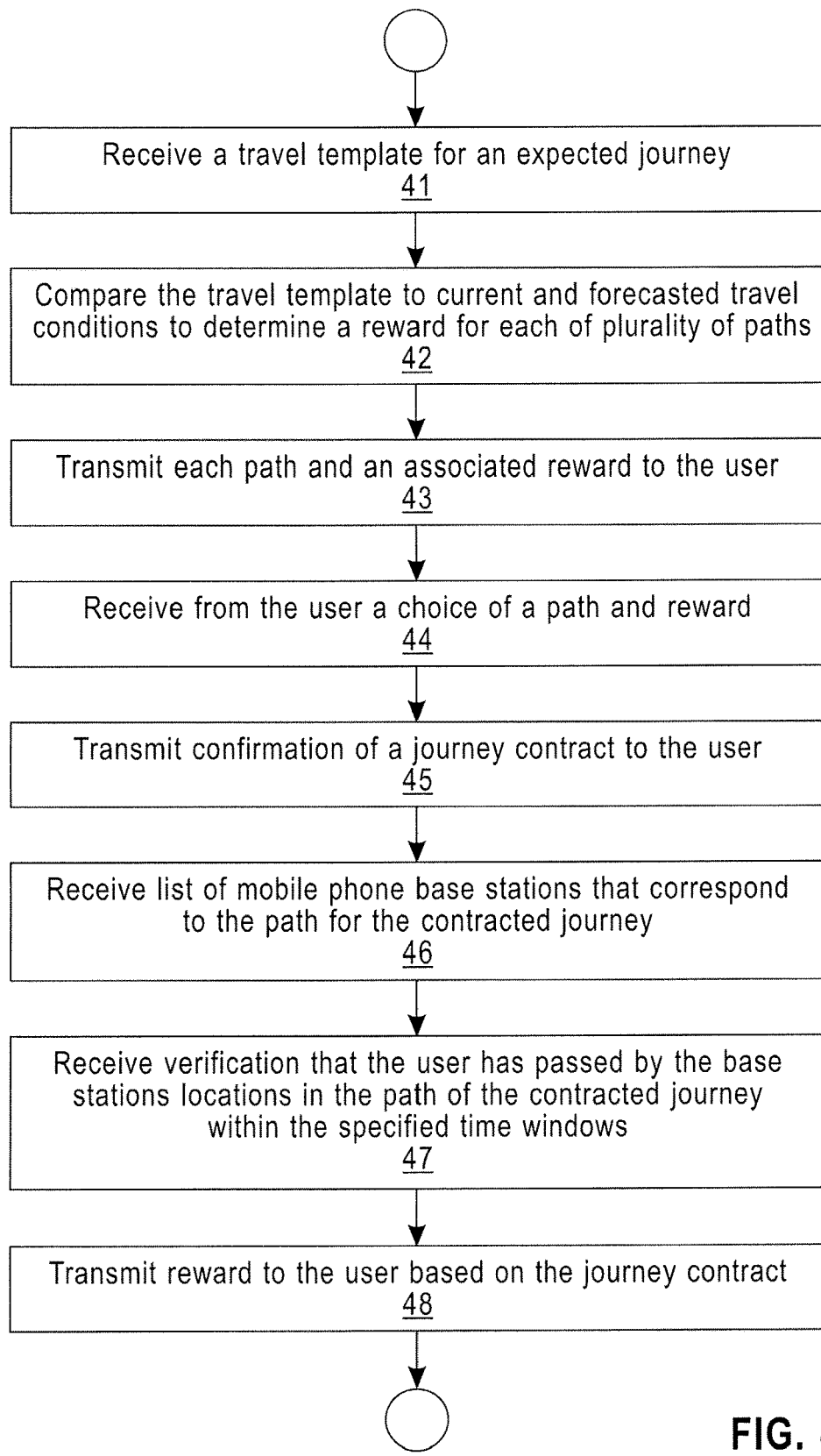
FIG. 4 is a flow chart of a method for incentivizing travel patterns, according to an embodiment of the disclosure.

FIG. 4 is a flow chart of a method for incentivizing travel patterns, according to an embodiment of the disclosure. Referring to the figure, a method begins at step 41 when a backend server receives from a user a travel template for an expected journey that includes an origin, a destination, and a time window for the journey. The travel template is compared at step 42 to current and forecasted travel conditions during the time window over a travel network that connects the origin and destination to determine a reward for each of a plurality of paths that connect the origin and destination. At step 43, the paths and their associated rewards are transmitted to the user. At step 44, the server receives from the user a decision regarding the plurality of paths and the associated rewards. If the user has selected one of the plurality of paths and its associated reward as the path for the user's journey, a confirmation of a journey contract is transmitted to the user at step 45. At step 46, a list of mobile phone base stations that correspond to a path for the contracted journey is received, in which the contracted journey is decomposed into a finite list of locations, each associated with a mobile phone base station, and each associated with a specified time window. The user's performance of the journey contract is verified at step 47 by receiving verification that the user has passed through a threshold number of locations associated with those mobile phone base stations that correspond to the path of the contracted journey within the specified time windows. Upon verifying that the user has passed through a threshold number of locations, a reward is transmitted to the user at step 48 based on the journey contract.

While embodiments of the present disclosure have been described in detail with reference to exemplary embodiments, those skilled in the art will appreciate that various modifications and substitutions can be made thereto without departing from the spirit and scope of embodiments of the disclosure as set forth in the appended claims.

What is claimed is:

1. A method for incentivizing travel patterns, comprising the steps of:

receiving by a server from a mobile computing device of a user a travel template for an expected journey that includes an origin, a destination, and a time window for the journey;

comparing, by the server, the travel template to current and forecasted travel conditions during said time window on a travel network that connects the origin and destination to determine a reward for each of a plurality of paths connecting the origin and destination during said time period, wherein determining a reward for each of the plurality of paths connecting the origin and destination during said time period comprises calculating $\psi(c'-c_x)$, where $\psi(\bullet)$ is a non-decreasing function, $c_x$ is a cost associated with path x, and $c'=\varphi(x', M_x)$ wherein x' represents the expected journey, and $M_x$ represents a graph of a road network connecting the origin and destination of the expected journey, wherein connections between graph vertices are weighted based on a current or forecasted traffic load, and $\varphi()$ is a cost function which quantifies an impact of expected journey x' on the network given a network forecast $M_x$;

transmitting each path and an associated reward from the server to the mobile computing device of the user;

receiving, by the server from the mobile computing device of the user a decision regarding the plurality of paths and the associated rewards;

transmitting a confirmation of a journey contract from the server to the mobile computing device of the user, if the user has selected one of the plurality of paths and its associated reward as the path for the user's journey;

verifying, by the server, performance of the user's journey contract by receiving verification that the user has passed through a threshold number of locations associated with mobile phone base stations that correspond to a path of the contracted journey within specified time windows; and transmitting a reward from the server to the mobile computing device of the user based on the journey contract, upon verifying that the user has passed through a threshold number of locations.

2. The method of claim 1, further comprising receiving by the server from the mobile computing device of the user a request for more path options, if the user rejects all of the plurality of paths.

3. The method of claim 1, further comprising receiving by the server a list of mobile phone base stations that correspond to a path for the contracted journey, wherein the contracted journey is decomposed into a finite list of locations, each associated with a mobile phone base station, and each associated with a specified time window.

4. The method of claim 3, wherein receiving a list of mobile phone base stations further comprises transmitting path information about the contracted journey to a mobile phone service provider, and receiving the list of phone base stations that correspond to the path from the mobile phone service provider.

5. The method of claim 3, wherein receiving a list of mobile phone base stations further comprises receiving a list from a mobile phone service provider of all mobile phone base stations in a geographic vicinity of the contracted journey, and selecting those mobile phone base stations that correspond to the path of the contracted journey.

6. The method of claim 3, wherein verifying that the user has passed through a threshold number of locations comprises receiving a list of time-stamps from each mobile phone base station passed that were recorded using a location service on the user's mobile phone.

7. The method of claim 3, wherein verifying that the user has passed through a threshold number of locations comprises receiving a verification signal from the user that indicates whether the user's phone was at the contracted base station locations during the contracted time windows within an agreed margin of error.

8. A system for incentivizing travel patterns, comprising:
a negotiator that receives a travel template from a traveler's mobile application, transmits a set of journey options to the traveler, receives a journey selected from the journey options, and sends a journey contract to the traveler based on the selected journey, wherein the travel template includes an origin, a destination and an approximate departure/arrival time, wherein each journey option specifies a route from the origin to the destination associated with a start time or time window and a reward, and the journey contract is a selected journey option;
a journey generator that determines the set of journey options based on the travel template, the traveler's historical behavior, and current network conditions;
a rewards engine that calculates the reward associated with each journey option based on a reduction in cost for the journey by calculating $\psi(c'-c_x)$, where $\psi(\bullet)$ is a non-decreasing function, $c_x$ is a cost associated with journey x, and $c'=\varphi(x', M_x)$ wherein x' represents an expected journey, and $M_x$ represents a graph of a road network connecting the origin and destination of the expected journey, wherein connections between graph vertices are weighted based on a current or forecasted traffic load, and $\varphi(\ )$ is a cost function which quantifies an impact of expected journey x' on the network given a network forecast $M_x$;
a location arbitrator that receives location information from the traveler as the travelers performs the journey specified in the journey contract; and
a verification engine that receives location information from the location arbitrator and verifies, based on the location information, whether the traveler's journey complied the terms of the journey contract, and determines the traveler's reward as calculated by the rewards engine based on a degree of compliance with the contract, and upon verifying that the user has passed through a threshold number of locations, transmits a reward to the user based on the journey contract.

9. The system of claim 8, further comprising a normal behavior model that is used by the journey generator to determine a reward for each journey option, wherein the reduction in cost is determined with respect to a normal behavior pattern for the journey option.

10. The system of claim 8, wherein the location arbitrator receives a list of mobile phone base stations that correspond to the contracted journey, wherein the contracted journey is decomposed into a finite list of locations, each associated with a mobile phone base station, and each associated with a specified time window.

11. The system of claim 10, wherein the verification engine verifies whether the traveler's journey complied the terms of the journey contract by determining whether the user has passed through a threshold number of locations associated with those mobile phone base stations that correspond to the path of the contracted journey within the specified time windows.

12. A non-transitory program storage device readable by a computer, tangibly embodying a program of instructions executed by the computer to perform the method steps for incentivizing travel patterns, the method comprising the steps of:
receiving by a server from a mobile computing device of a user a travel template for an expected journey that includes an origin, a destination, and a time window for the journey;
comparing, by the server, the travel template to current and forecasted travel conditions during said time window on a travel network that connects the origin and destination to determine a reward for each of a plurality of paths connecting the origin and destination during said time period, wherein determining a reward for each of the plurality of paths connecting the origin and destination during said time period comprises calculating $\psi(c'-c_x)$, where $\psi(\bullet)$ is a non-decreasing function, $c_x$ is a cost associated with path x, and $c'=\varphi(x', M_x)$ wherein x' represents the expected journey, and $M_x$ represents a graph of a road network connecting the origin and destination of the expected journey, wherein connections between graph vertices are weighted based on a current or forecasted traffic load, and $\varphi(\ )$ is a cost function which quantifies an impact of expected journey x' on the network given a network forecast $M_x$;
transmitting each path and an associated reward from the server to the mobile computing device of the user;
receiving by the server from the mobile computing device of the user a decision regarding the plurality of paths and the associated rewards;
transmitting a confirmation of a journey contract from the server to the mobile computing device of the user, if the user has selected one of the plurality of paths and its associated reward as the path for the user's journey;
verifying, by the server, performance of the user's journey contract by receiving verification that the user has passed through a threshold number of locations associated with mobile phone base stations that correspond to a path of the contracted journey within specified time windows; and
transmitting a reward from the server to the mobile computing device of the user based on the journey contract, upon verifying that the user has passed through a threshold number of locations.

13. The computer readable program storage device of claim 12, the method further comprising receiving by the server a list of mobile phone base stations that correspond to a path for the contracted journey, wherein the contracted journey is decomposed into a finite list of locations, each associated with a mobile phone base station, and each associated with a specified time window.

* * * * *